US008005246B2

(12) United States Patent
Ribic

(10) Patent No.: US 8,005,246 B2
(45) Date of Patent: Aug. 23, 2011

(54) HEARING AID APPARATUS

(75) Inventor: Zlatan Ribic, Vienna (AT)

(73) Assignee: SWAT/ACR Portfolio LLC, Cupertino, CA (US)

( * ) Notice: Subject to any disclaimer, the term of this patent is extended or adjusted under 35 U.S.C. 154(b) by 973 days.

(21) Appl. No.: 11/877,535

(22) Filed: Oct. 23, 2007

(65) Prior Publication Data

US 2009/0103742 A1 Apr. 23, 2009

(51) Int. Cl.
*H04R 25/00* (2006.01)
*G06F 17/00* (2006.01)

(52) U.S. Cl. ........................... 381/316; 381/320; 700/94

(58) Field of Classification Search .................... 381/60, 381/316, 320; 600/25; 607/56–57; 700/94
See application file for complete search history.

(56) References Cited

U.S. PATENT DOCUMENTS

| | | | | |
|---|---|---|---|---|
| 4,495,643 | A | 1/1985 | Orban | |
| 4,525,857 | A | 6/1985 | Orban | |
| 5,394,475 | A | 2/1995 | Ribic | |
| 5,488,668 | A * | 1/1996 | Waldhauer | 381/320 |
| 5,500,902 | A | 3/1996 | Stockham, Jr. et al. | |
| 5,528,696 | A | 6/1996 | Ribic | |
| 5,633,937 | A | 5/1997 | Ribic | |
| 5,776,179 | A * | 7/1998 | Ren et al. | 607/137 |
| 6,104,822 | A | 8/2000 | Melanson et al. | |
| 6,173,062 | B1 | 1/2001 | Dibachi et al. | |
| 6,674,868 | B1 | 1/2004 | Narusawa | |
| 6,700,982 | B1 | 3/2004 | Geurts et al. | |
| 6,732,073 | B1 | 5/2004 | Kluender et al. | |
| 6,868,163 | B1 * | 3/2005 | Goldstein | 381/321 |
| 7,219,065 | B1 | 5/2007 | Vandali et al. | |
| 2003/0028374 | A1 * | 2/2003 | Ribic | 704/233 |
| 2005/0008176 | A1 | 1/2005 | Pedersen | |
| 2006/0087380 | A1 | 4/2006 | Hohmann | |

FOREIGN PATENT DOCUMENTS

KR 20060092456 A 8/2006

OTHER PUBLICATIONS

International Application No. PCT/US2008/079880, International Search Report, Jun. 18, 2009.

"Speech signal modification to increase intelligibility in noisy environments", Yoo et al., J. Acoustical Society of America, vol. 122, No. 2, Aug. 2007, pp. 1138-1149.

"Companding to improve cochlear-implant speech recognition in speech-shaped noise", Bhattacharya et al., J. Acoustical Society of America, vol. 122, No. 2, Aug. 2007, pp. 1079-1089.

(Continued)

*Primary Examiner* — Curtis Kuntz
*Assistant Examiner* — Jesse Elbin
(74) *Attorney, Agent, or Firm* — Edward P. Heller, III

(57) ABSTRACT

There is described a hearing aid comprising input transducer means for converting input acoustic signals into electrical input signals, signal processor means and output transducer means. The signal processor means is operable to divide said electrical input signals into a plurality of frequency bands and to perform a contrast enhancement operation in each said frequency band, to increase the difference between the amplitudes of those frequency components of the input electrical signals having a relatively high amplitude and those frequency components thereof having a relatively low amplitude to produce output electrical signals in each said respective frequency bands. The output transducer means is operable to produce an output acoustic signal corresponding to a combination of said output electrical signals.

7 Claims, 12 Drawing Sheets

OTHER PUBLICATIONS

"Development of Test procedure and Test-signal for characterization of Speech-Amplification by Hearing Aids—Status Sep. 2006", Gert Ravn, IEC TC 29—WG 13, Sep. 19, 2006.

"Adaptive Spectral Contrast Enhancement Based on Masking Effect for the Hearing Impaired", Ribic et al., Acoustics, Speech, and Signal Processing ICASSP-06 Conference Proceedings, vol. 2, pp. 937-940, 1996.

* cited by examiner

BAND 5 666-1KHz
CR=3

TOTAL SIGNAL

HEARING AID APPARATUS

The present invention relates to signal processing apparatus that is of particular, but not exclusive,application to the field of hearing aids.

Electronic hearing aids are well known in the art and typically comprise a microphone to receive sound and convert it to an electrical signal, a signal processor connected to the microphone that is operable to process the electrical signal and a loudspeaker operable to convert the electrical signal to an acoustic signal produced at the ear of the user. Typically the signal processor in such a hearing aid will carry out both amplification and filtering of the signal so as to amplify or attenuate the particular frequencies where the user suffers hearing loss. Such hearing aids can be mono, comprising a single earpiece, or stereo comprising a left and right earpiece for the left and right ears of a user respectively.

In addition to suffering from impaired hearing of particular frequencies, a person suffering from hearing loss may suffer from other hearing impediments that result from impaired function of the cochlea. The inventor has recognized that a healthy cochlea performs at least three important functions.

First, when an acoustic signal is received by the ear, the threshold of hearing is temporarily raised such that subsequent quieter acoustic signals received by the ear may be masked by the earlier acoustic signal. A healthy cochlea ensures that the increased threshold of hearing decays rapidly back to its equilibrium level. A person with hearing loss typically finds that the temporary raised hearing threshold takes longer to decay back to equilibrium. This can lead to an unnatural masking of subsequent acoustic signals heard some time after an initial masking acoustic signal.

Second, when an acoustic signal comprising a particular frequency is heard at the ear, the cochlea acts to raise the threshold of hearing not only for that frequency but for frequencies above and below that frequency. This effect is particularly acute for frequencies greater than the incident frequency. A person with hearing loss will find that their cochlea raises the threshold of hearing for the neighboring frequencies by a smaller amount than a healthy cochlea. This results in the surprising effect that a person with impaired hearing loss hears additional frequencies compared to a person with unimpaired hearing.

One object of the invention is to provide an improved hearing aid.

One object of the invention is to provide a hearing which produces inter-modulation distortion of acoustic signals received at the ear. Surprisingly, the user perceives the extra spectral content that results from the distortion as sounding natural.

Another object of the present invention is to provide an improved hearing aid that is operable to perform improved signal processing to more accurately compensate for cochlear hearing loss.

Preferred embodiments of the present invention will now be described by way of example only with reference to the accompanying drawings, in which:

FIG. 1*a* schematically illustrates a user wearing left and right hearing aids and a sound source in the vicinity of the user;

FIG. 1*b* schematically illustrates the placement of the right hearing aid of FIG. 1*a* within the ear of a user;

FIG. 2*a* is a three dimensional plot showing the changes in the threshold of hearing in the time and frequency domain that occur in a person with unimpaired hearing for an example acoustic signal;

FIG. 2*b* is a three dimensional plot showing two cross sections of the plot of FIG. 2*a;*

FIG. 3*a* is a plot in three dimensions showing the changes in the threshold of hearing in the time and frequency domain that occur in a person with cochlear hearing loss for an example acoustic signal;

FIG. 3*b* is three dimensional plot showing two cross sections of the plot of FIG. 3*a;*

Figure 5:
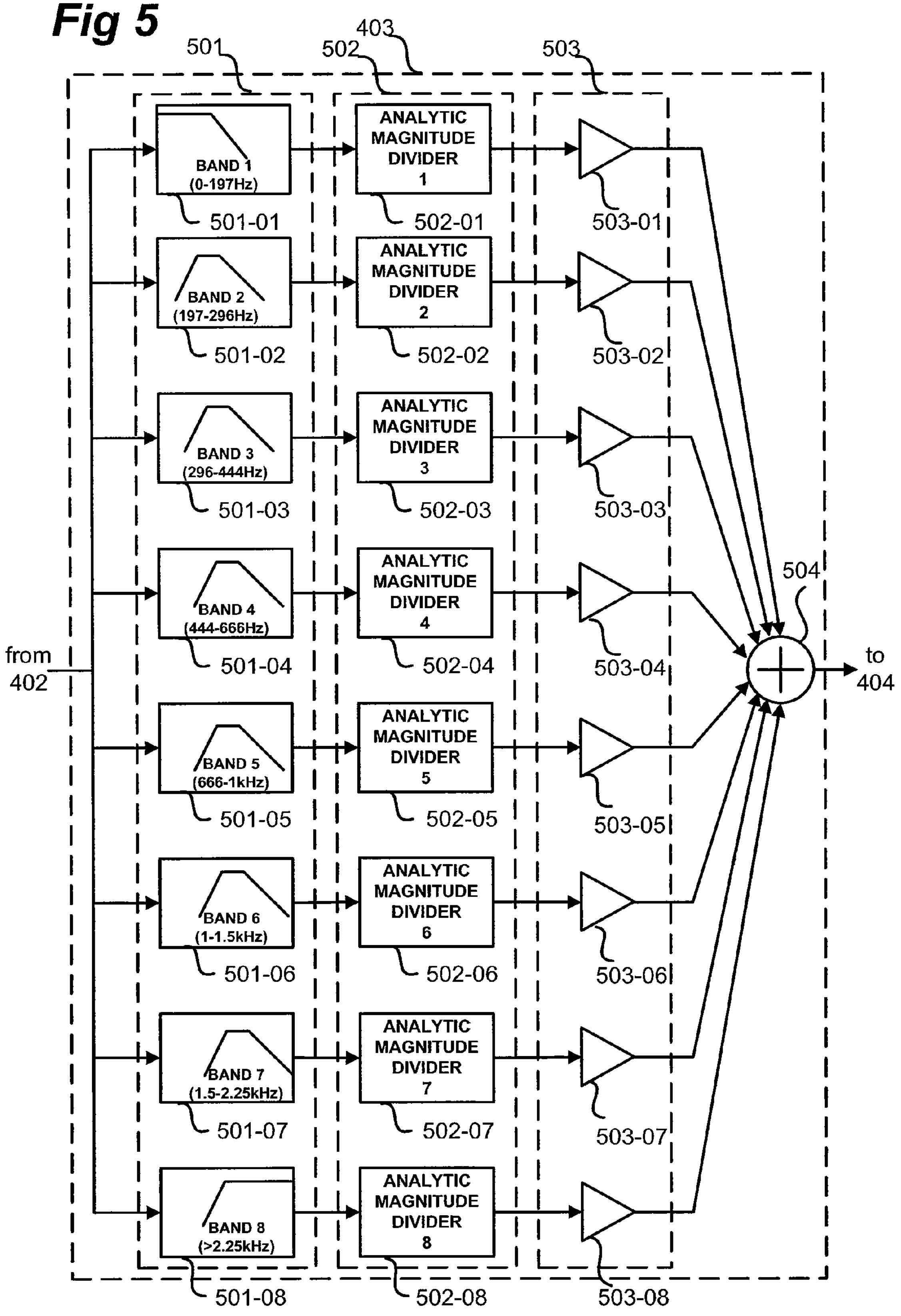
FIG. 5 is a block diagram illustrating the functional components that comprise the 'Masking Compensation Unit' of FIG. 4.
Figure 7A:
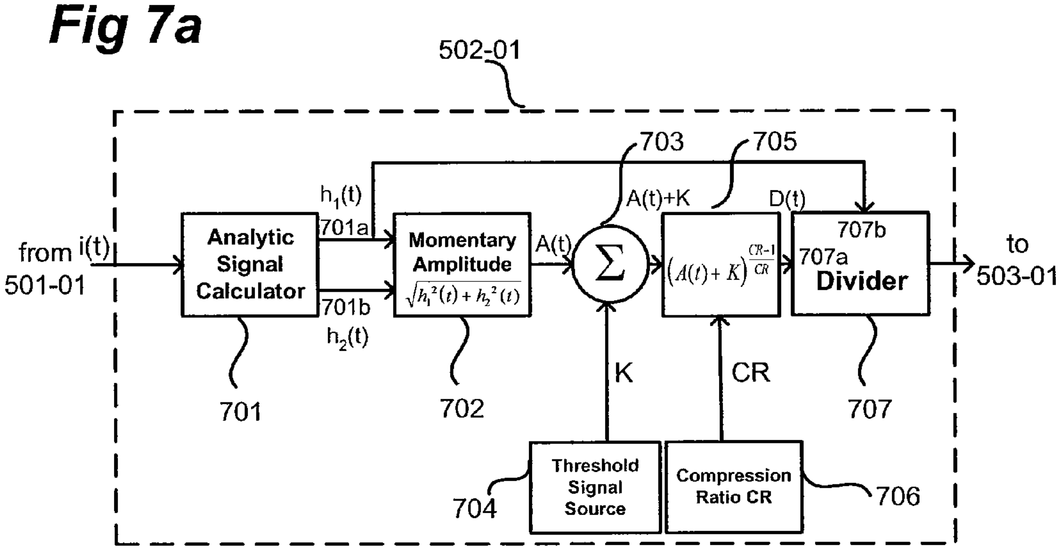
Figure 7B:
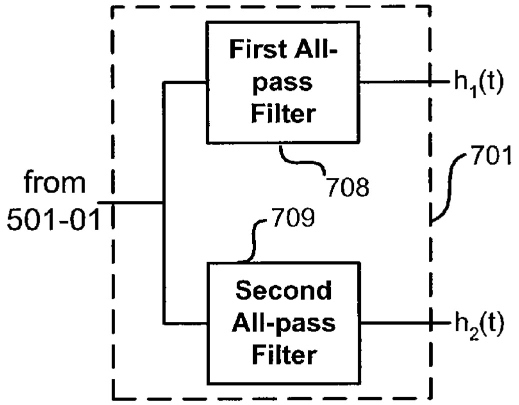

FIG. 7*a* is a block diagram showing the functional components of the first 'Analytic Magnitude Divider' block of FIG. 5;

FIG. 7*b* is a block diagram showing the functional components of the 'Analytic signal calculator' of FIG. 7*a;*

Figure 7C:
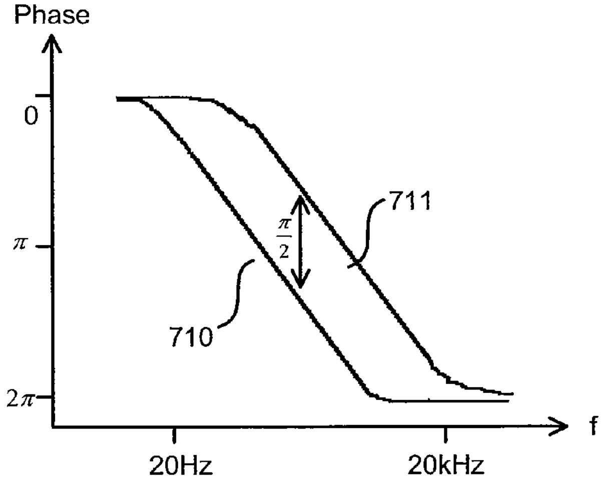

FIG. 7*c* is a plot of the phase response of the first and second all pass filters of FIG. 7*b;*

Figure 8A:
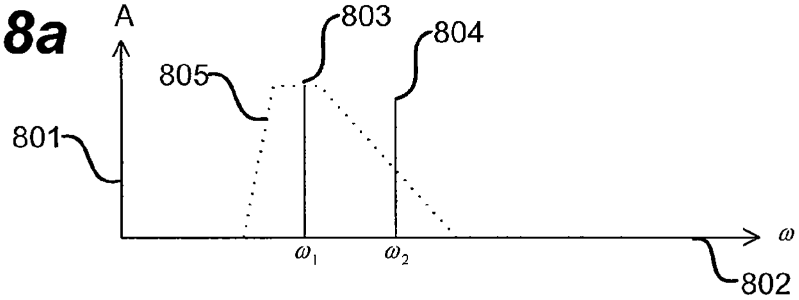
Figure 8B:
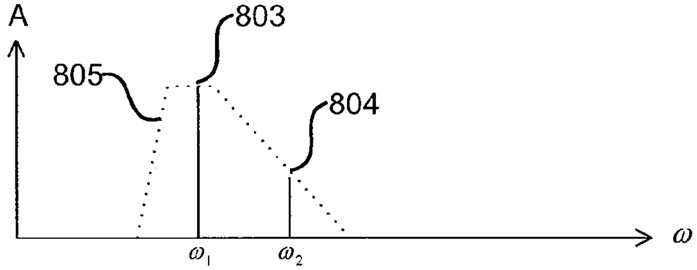
Figure 8C:
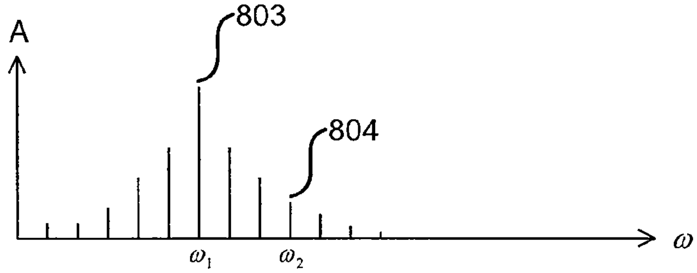

FIG. 8*a* is a plot of the frequency spectrum of an example input signal comprising two frequency components;

FIG. 8*b* shows the frequency spectrum of FIG. 8*a* after filtering by one of the filters comprising the 'Filter Bank' of FIG. 5;

FIG. 8*c* shows the frequency spectrum of FIG. 8*b* after processing by the AMD of FIG. 7*a;*

Figure 9:
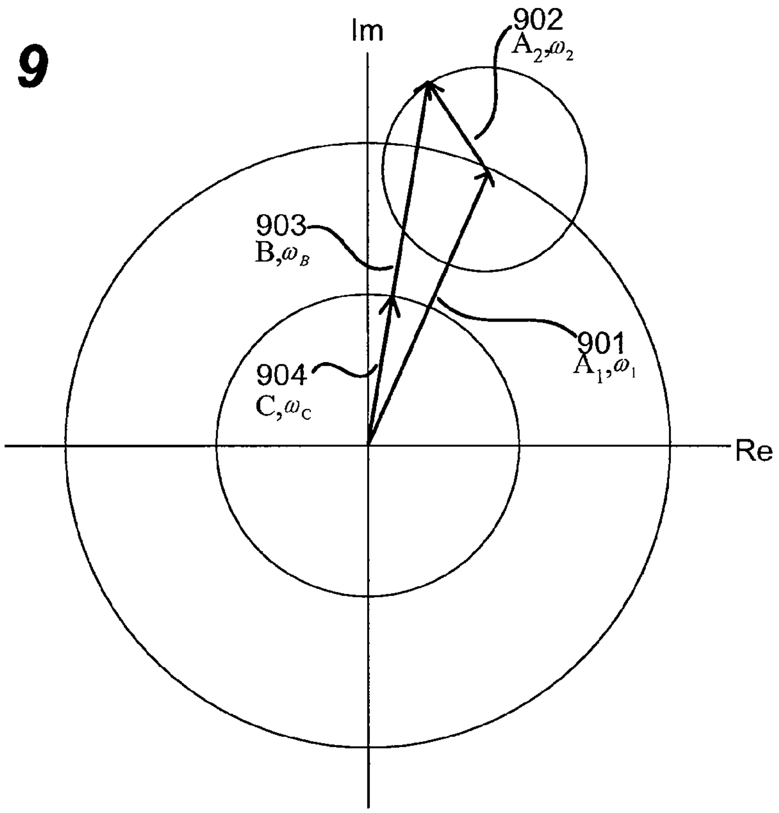
Figure 10A:
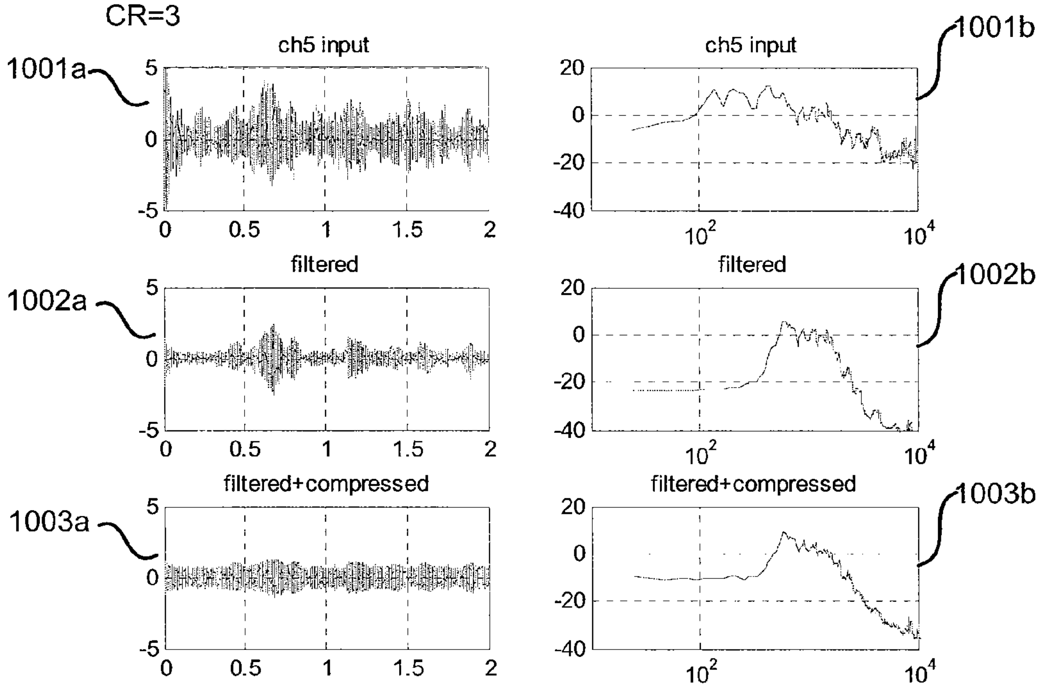
Figure 10B:
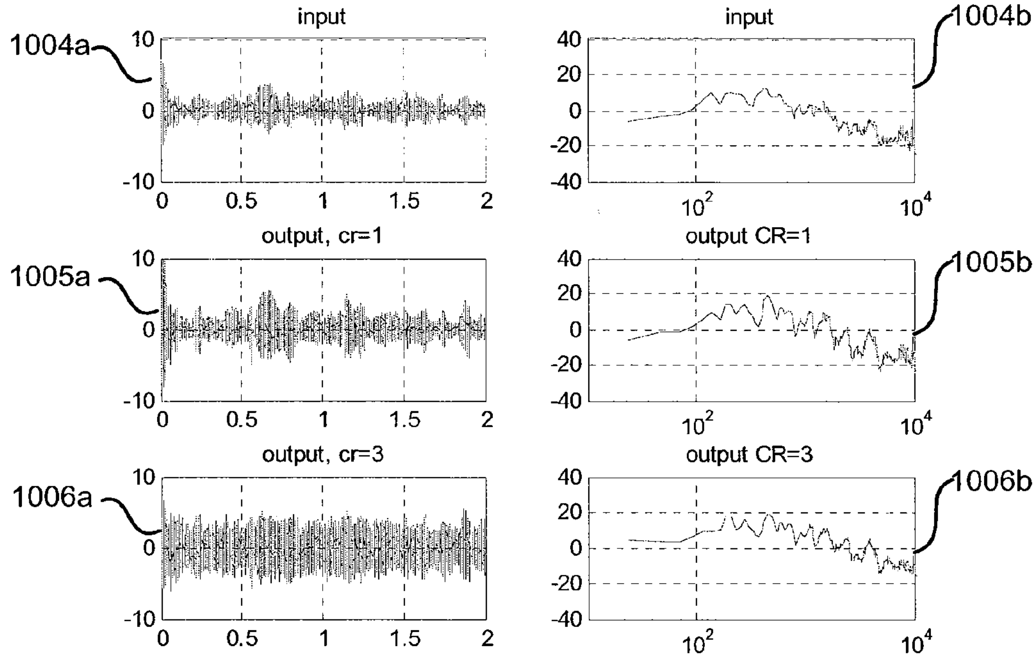
Figure 11:
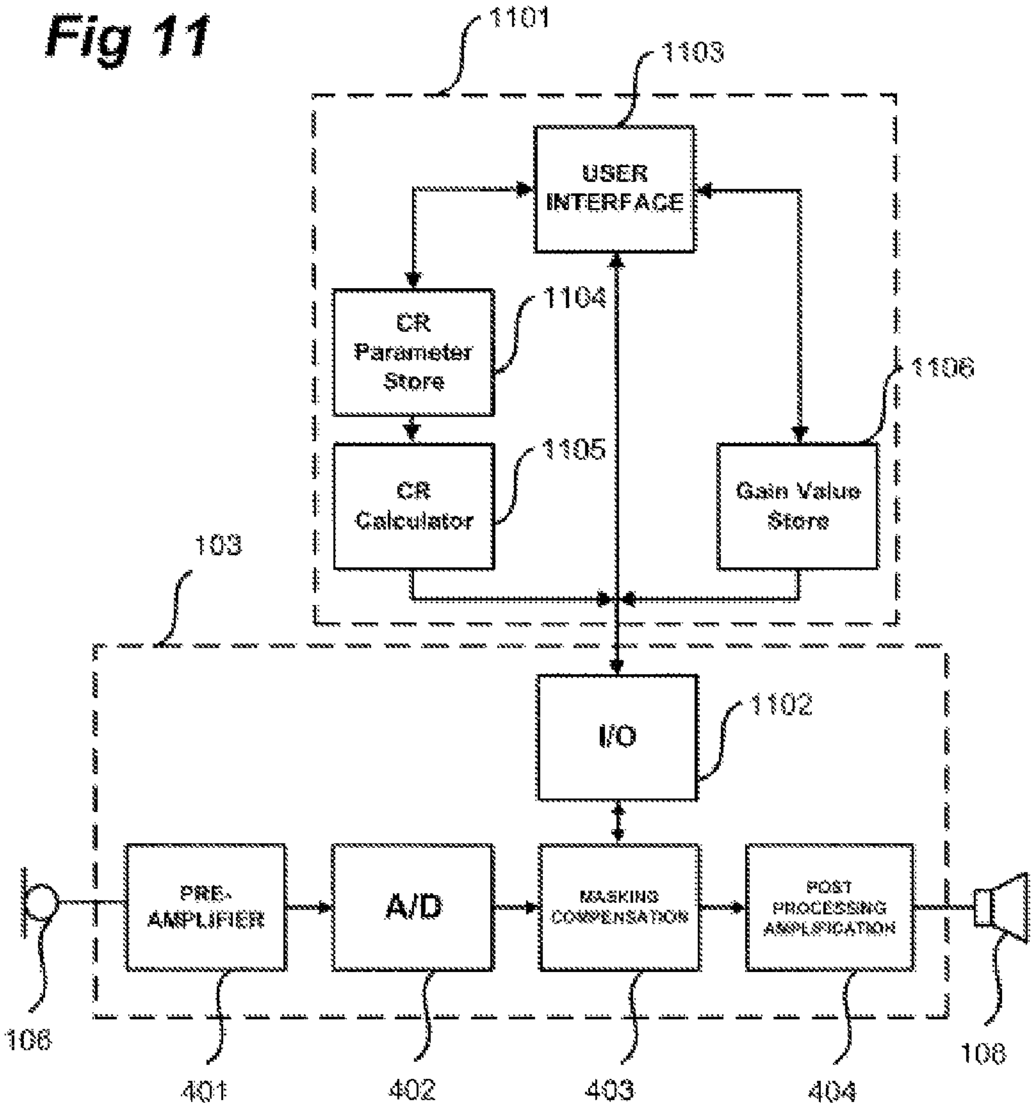
Figure 12:
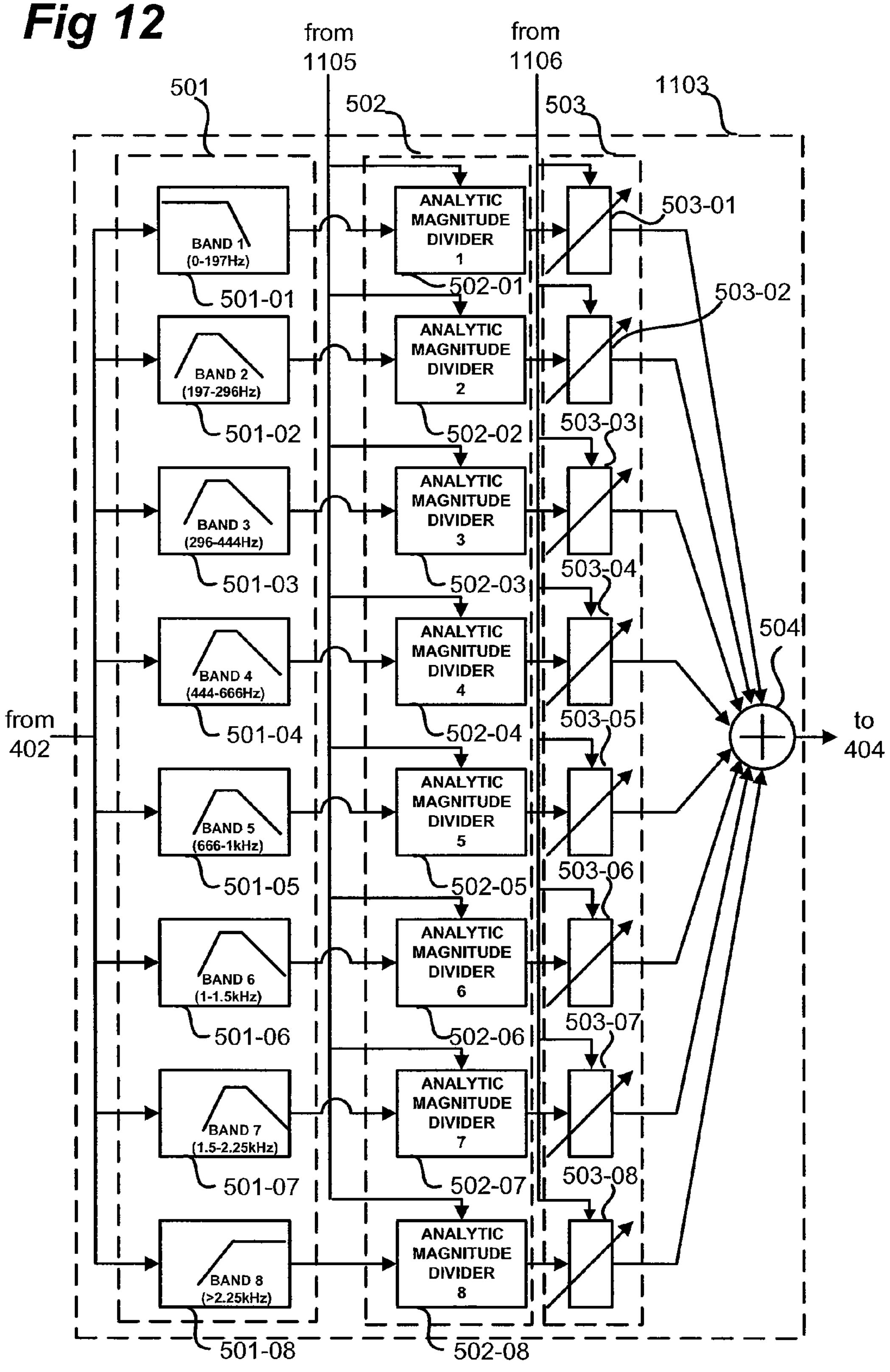
Figure 13:
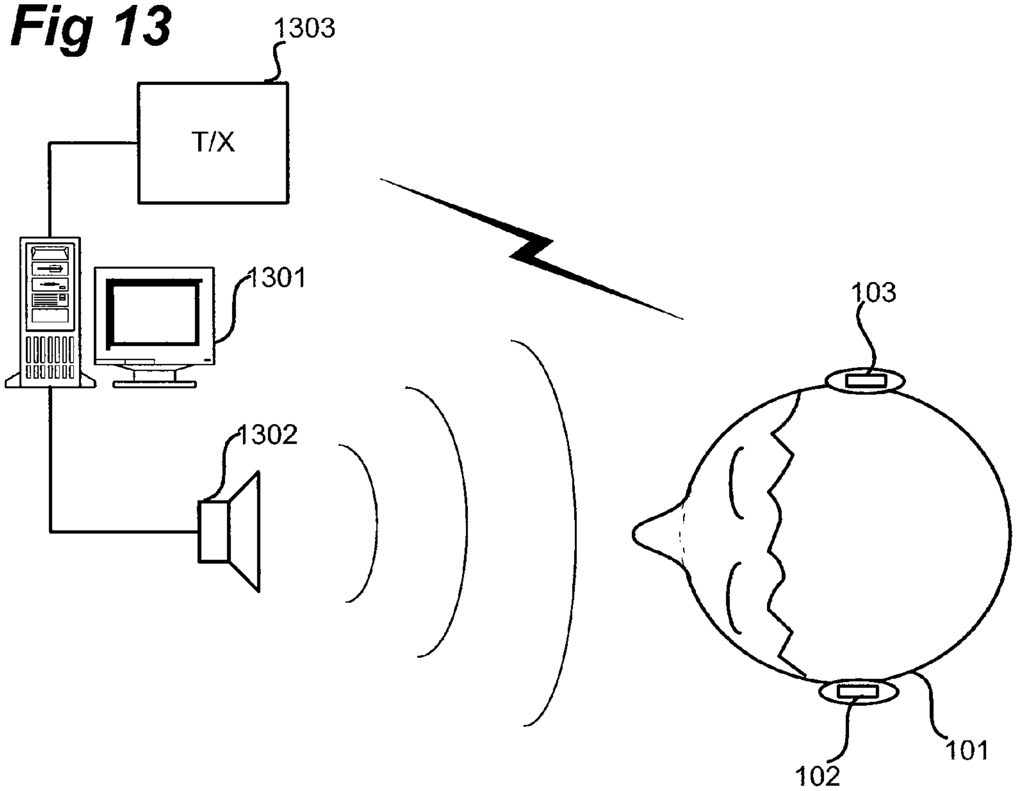
Figure 14:
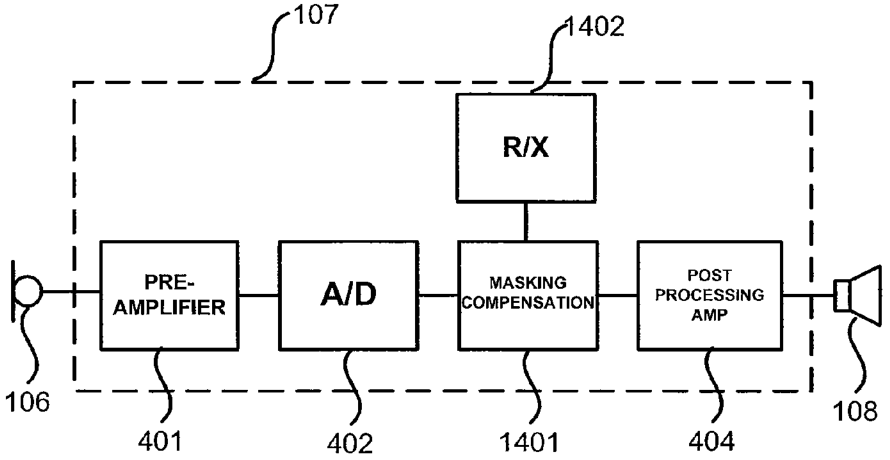
Figure 15:
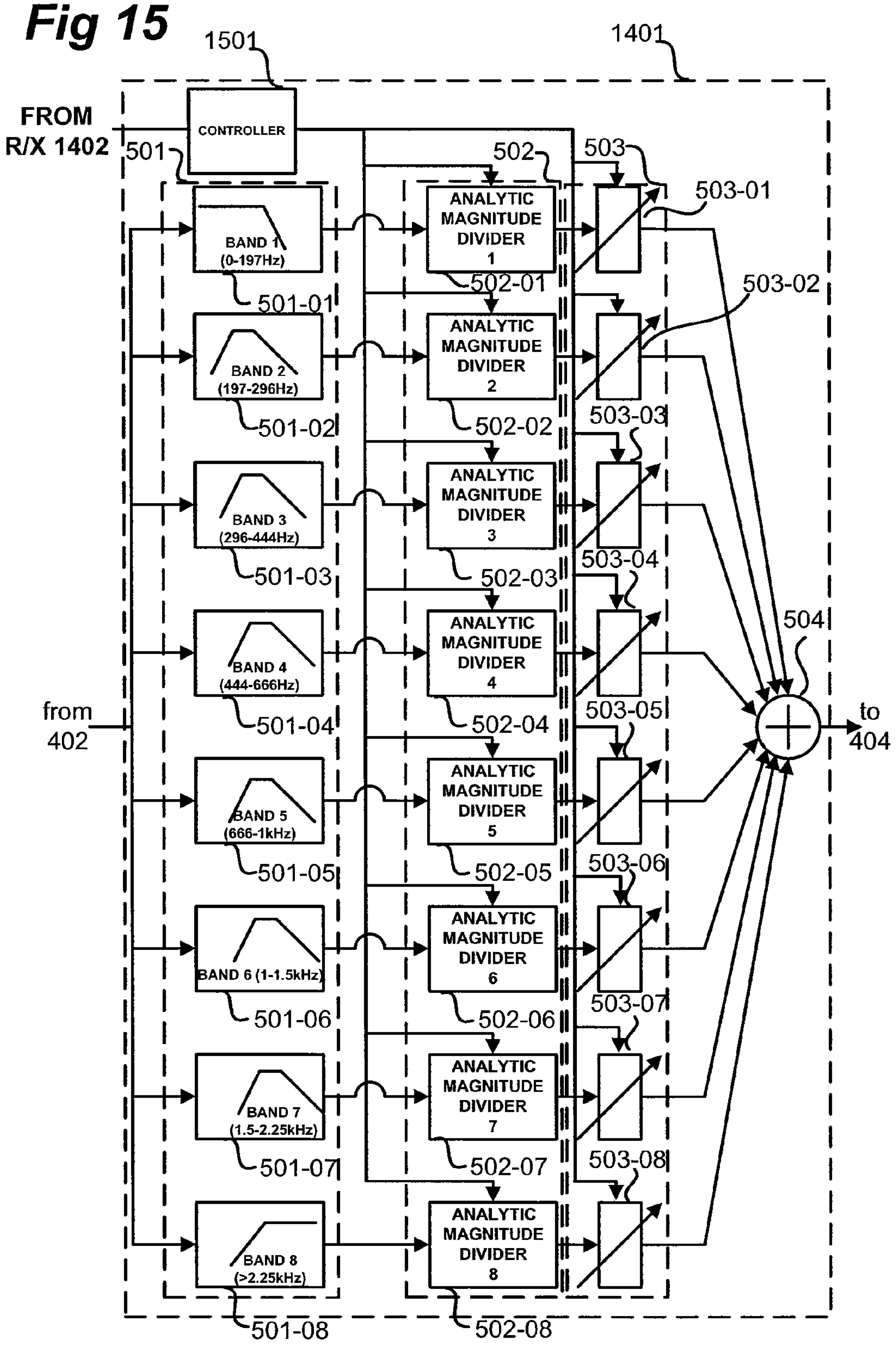

FIG. 9 is a plot of complex components relating to the individual frequency components of FIG. 8*a*, their sum and an infinitely compressed output signal;

FIG. 10*a* illustrates the signal modification performed by the fifth channel (666-1 kHz) for a compression ratio of 3 and comprises three sets of plots, each set comprising a plot in the time and frequency domain. The first set illustrates an input signal, the second set illustrating the input signal after filtering, and the third set illustrate the signal after filtering and processing by an AMD;

FIG. 10*b* shows signal modification performed by the hearing aid system and comprises three sets of plots, each set comprising a plot in the time and frequency domain. The first set illustrates the total input signal, the second set the output signal when the compression ratio is 1, and the third set the output signal when the compression ratio is 3;

FIG. 11 is a block diagram showing the functional components of a hearing aid in a second embodiment;

FIG. 12 is a block diagram showing the functional components of the masking compensation unit of FIG. 11;

FIG. 13 is a schematic drawing showing a hearing aid system in a third embodiment where said hearing aid system comprises a computer and a hearing aid, where said computer is operable to cooperate with the hearing aid to perform a hearing test on the user;

FIG. 14 is a block diagram showing the functional components of the right hearing aid of FIG. 13; and FIG. 15 is a block diagram showing the functional components of the masking compensation unit of FIG. 14.

OVERVIEW OF FIRST EMBODIMENT

A brief overview of an embodiment of the present invention will now be given with reference to FIGS. 1 to 3.

Figure 1A:
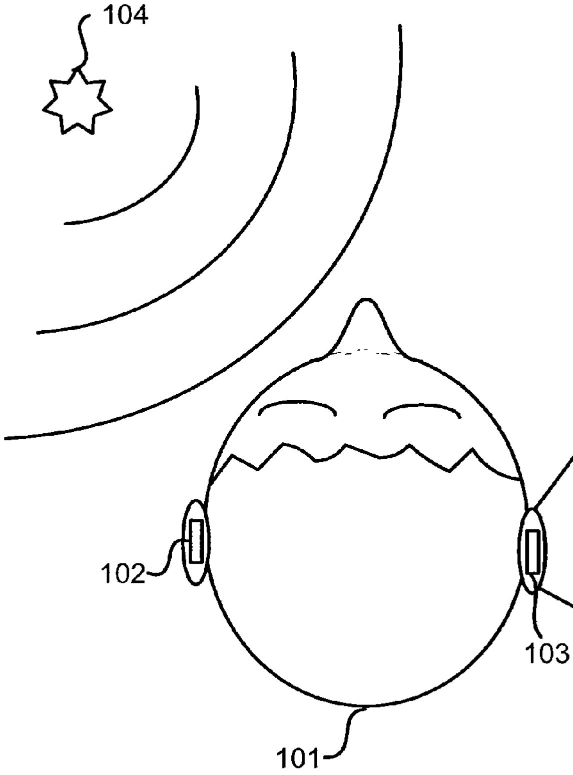

FIG. 1*a* is a schematic drawing showing an overhead view of a user 101 wearing left and right hearing aids 102 and 103. In the illustrated example a sound source 104 is located in front of and to the left of the user 101.

Figure 1B:
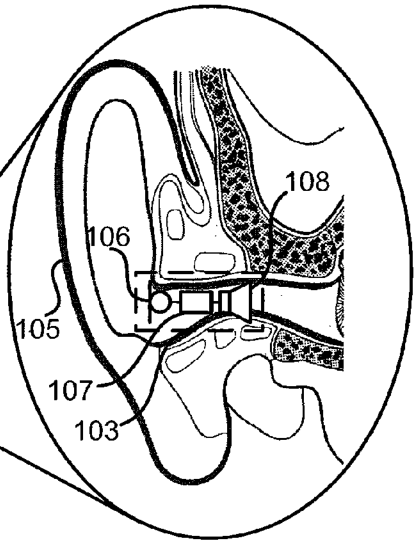

FIG. 1*b* is a schematic drawing showing a close up view of a right ear 105 of the user 101 of FIG. 1*a*. As shown, the right hearing aid 103 is positioned in the ear of the user 101 and comprises a microphone 106, a signal processing unit 107 and a loudspeaker 108. The hearing aid microphone 106 is operable to receive acoustic signals, for example, such as those produced by the sound source 104 and convert the acoustic signals into electrical signals. The signal processing unit 107 is operable to process the microphone signal to at least partially compensate for the effects of cochlear hearing loss and the loudspeaker 108 is operable to convert the processed electrical signal to an acoustic signal and output said signal at the ear of the user 105.

It is instructive to illustrate the different types of masking that can occur in a listener suffering from cochlear hearing loss so as to understand the improved signal processing provided by the presently described embodiment. The effects of cochlear hearing loss on a listener will now be described with reference to FIGS. 2*a*, 2*b*, 3*a* and 3*b*.

Figure 2A:
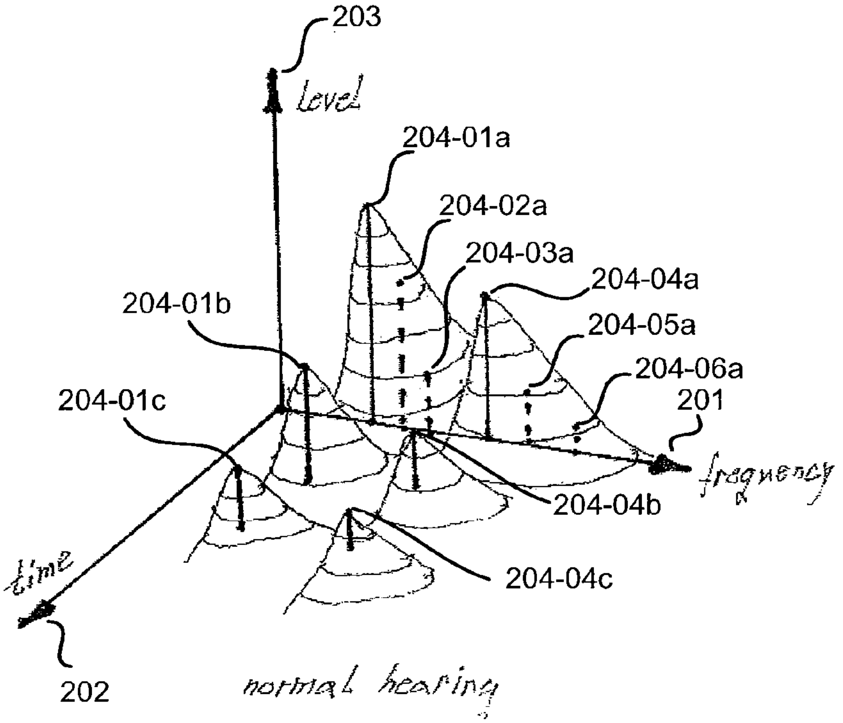

Turning first to FIG. 2*a*, illustrated is a plot of the spectral components of a series of three acoustic signals received from a sound source such as the sound source 104 of FIG. 1 and the resulting thresholds of hearing. Frequency and time are denoted by the x-axis and y-axis 201 and 202 respectively. Both the magnitude of the frequency components of the sound signal and the level of the threshold of hearing are denoted by the z-axis 203.

Figure 2B:
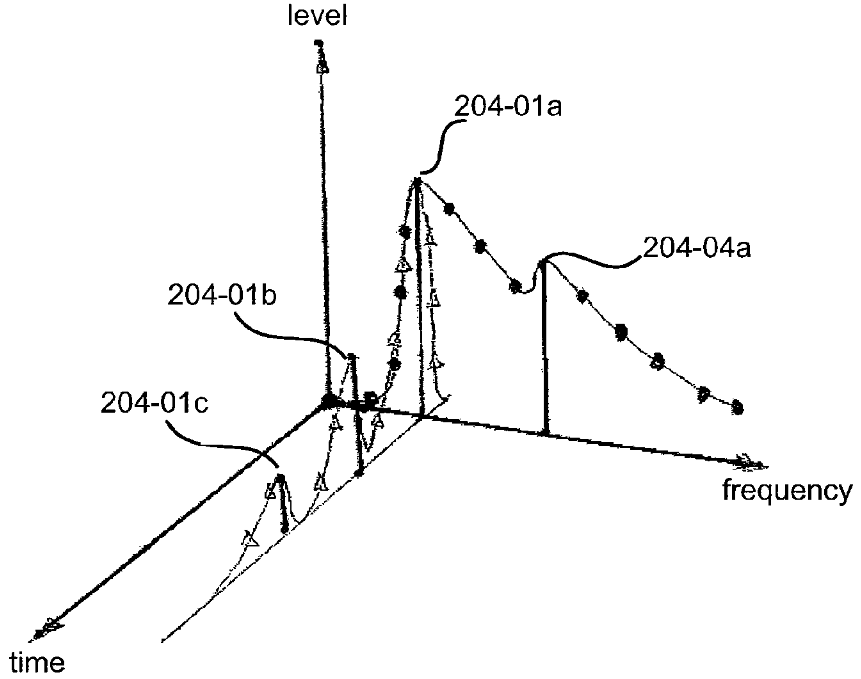

In the example shown in FIGS. 2*a* and 2*b*, a first acoustic signal comprising a first frequency spectrum, comprising six spectral components 204-01*a* to 204-06*a* of different magnitude, is received at the ear. There are two spectral peaks in the first frequency spectrum given by the first and fourth frequency components 204-01*a* and 204-04*a*. In the example illustrated, the magnitude of the first spectral component 204-01*a* is greater than the magnitude of the fourth spectral component 204-04*a*.

The plot further shows a second frequency spectrum, corresponding to a second acoustic signal incident at the ear a finite time after the first acoustic signal. The second frequency spectrum comprises a pair of frequency components 204-01*b* and 204-04*b* corresponding in frequency to the first and fourth components 204-01*a* and 204-01*b* of the first frequency spectrum but with smaller magnitude. The plot further shows a third spectrum corresponding to a third acoustic signal incident at the ear a finite time after the second acoustic signal. The third spectrum comprises a further pair of frequency components 204-01*c* and 204-04*c* corresponding in frequency to the first and fourth components of the first spectrum and the second spectrum, but having magnitudes smaller than the corresponding components 204-01*b* and 204-04*b* of the second spectrum.

When an acoustic signal comprising one or more frequency components is received by the ear, the threshold of hearing is temporarily raised at the component frequencies such that later quieter acoustic signals comprising corresponding frequencies received by the ear may be masked by the earlier acoustic signal. One of the functions performed by a healthy cochlea is to ensure that this increased threshold of hearing decays rapidly back to its equilibrium level. A person with hearing loss typically finds that the temporarily raised hearing threshold takes longer to decay back to equilibrium. This can lead to an unnatural masking of subsequent acoustic signals heard some time after the initial masking acoustic signal.

Further, when an acoustic signal comprising a particular frequency is heard at the ear, a healthy cochlea acts to raise the threshold of hearing not only for that frequency but for frequencies above and below that particular frequency. Frequencies higher than the incident frequency tend to be masked more than frequencies lower than the incident frequency. A person with hearing loss will find that their cochlea raises the threshold of hearing for the surrounding frequencies less than a healthy cochlea. The inventor has recognized the surprising effect that a person with cochlear hearing loss hears additional frequencies relative to a person with normal hearing.

The contour lines of FIG. 2*a* illustrate the changes in the threshold of hearing that is typical in a person with a healthy cochlea. In the illustrated plot, zero on the z-axis is taken to be the equilibrium threshold level for each frequency.

In particular, hearing threshold contours extend outwards from an apex at the tip of each of the spectral peaks 204-01*a*, 204-01*b*, 204-01*c* and 204-04*a*, 204-04*b*, 204-04*c* to form a substantially elliptical base on the x-y plane enclosing an asymmetric volume. The volume enclosed by the contours covers the spectral components 204-02*a*, 204-03*a*, 204-05*a* and 304-06 204-06*a* which, are drawn in dashed lines to indicate that they lie below the raised threshold of hearing and are, therefore, not audible by a listener.

As a result of the rapid decay of the threshold of hearing in the time domain affected by a healthy cochlea, the raised threshold contour lines in the positive direction of the time-axis return rapidly to the equilibrium value before the incidence of the second acoustic signal. This means that spectral components 204-01*b* and 204-04*b* of the second acoustic signal will remain audible to the listener. Similarly, the threshold contours corresponding to the first and second spectral peaks of the second spectrum 204-01*b* and 204-04*b* decay back to zero before the incidence of the third acoustic signal comprising the third spectrum, therefore, the spectral components 204-01*c* and 204-04*c* will also remain audible. The threshold of hearing is also raised slightly before the incidence of the first, second and third acoustic signals. This is a known effect called 'backward masking' and is a consequence of the way the ear encodes auditory signals as neural impulses that are subsequently sent to the brain. Some information sent from the ear to the brain in the form of electrical impulses can be lost regarding lower amplitude acoustic signals received previous to the incidence of a higher amplitude acoustic signal.

In the frequency domain denoted by the x-axis, the hearing threshold contours are asymmetrical about the spectral peaks and extend further toward the higher frequencies than the low frequencies. The cochlea raises the threshold in the frequency domain and masks the low amplitude higher frequency components. Even though a listener is effectively hearing less spectral content, the masking of the higher frequency components sounds natural to a listener.

For clarity, FIG. 2*b* shows two cross sections through the contour map in the x and y directions respectively. The first cross section cuts across the length of the frequency axis at time equal to zero and the second cross section cuts across a line A-B that intersects the x-axis at the first spectral peak of the first spectrum 204-01*a*.

Figure 3A:
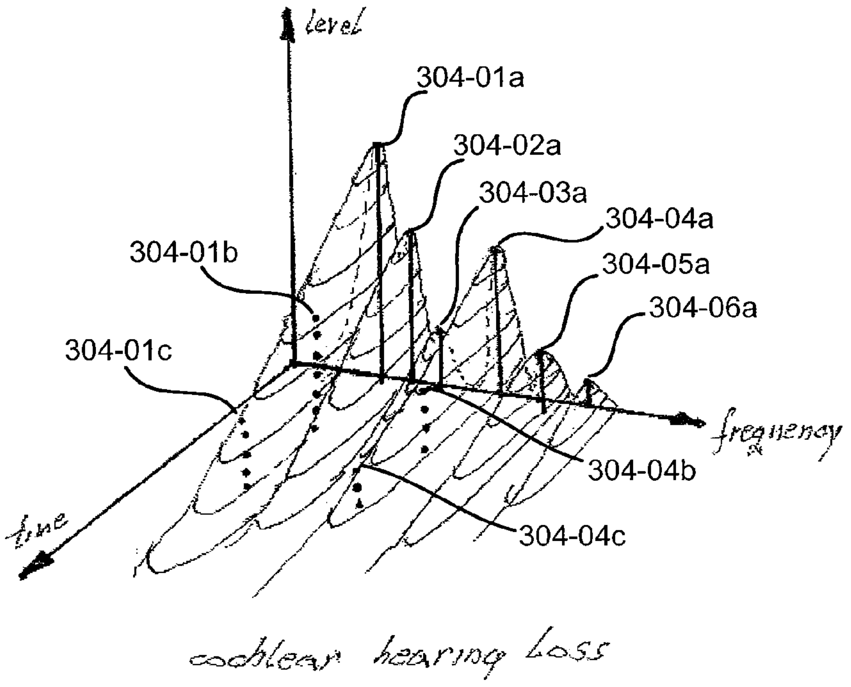
Figure 3B:
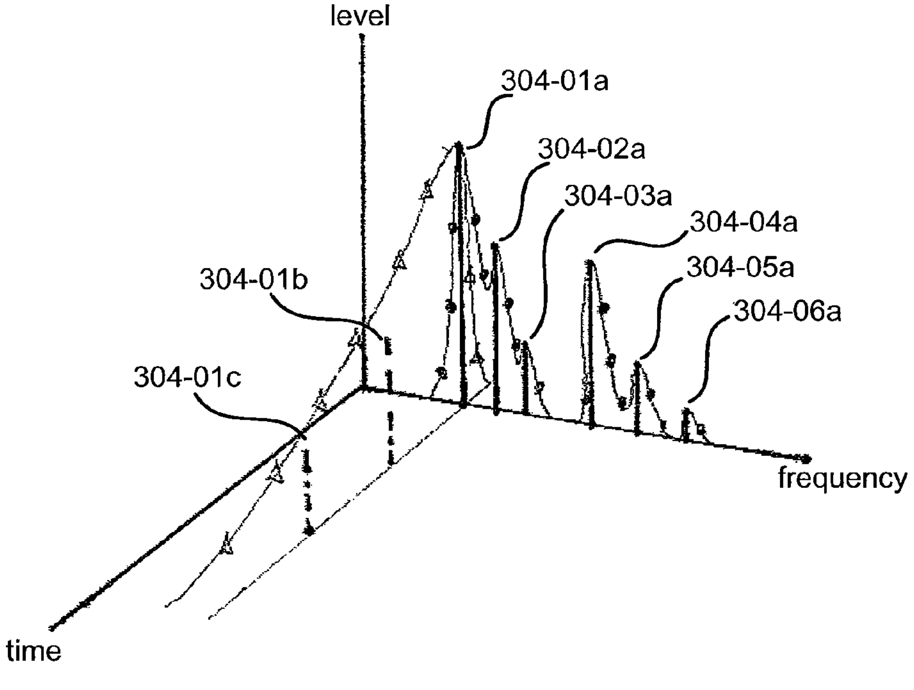

FIG. 3*a* shows the thresholds of a person with cochlear hearing loss for the same acoustic signals shown in FIG. 2*a*. The spectral components 304-01*a* to 304-06*a* correspond to the spectral components 204-01*a* to 204-06*a* of FIG. 2*a*. Similarly, components 304-01*b* to 304-01*c* and 304-04*b* to 304-04*c* correspond to the frequency components 204-01*b* to 204-01*c* and 204-04*b* to 204-04*c* of FIG. 2*a*.

In contrast to the raised thresholds for a person with no hearing loss shown in FIG. 2*a*, the raised threshold contours extend further in the time domain and extend less so in the frequency domain. This results in the spectral components of the subsequent second and third acoustic signals 304-01*b* to 304-01*c* and 304-04*b* to 304-04*c* being masked by the raised hearing threshold in the time domain. It is, therefore, desirable for persons with cochlear hearing loss to have the masked low amplitude frequency components amplified to a level that is greater than the increased hearing threshold, or conversely for the high amplitude frequency components to be attenuated so that the threshold of hearing is lowered.

However, in contrast to the raised thresholds in the time domain, the threshold contours decrease in height rapidly with frequency away from the incident frequency in both directions. A person with cochlear hearing loss will, therefore, hear additional frequencies relative to a person with unimpaired hearing. These additional frequencies will sound unnatural to a person with cochlear hearing loss and it is, therefore, desirable to attenuate or remove these frequencies.

As will be described more fully below in a first embodiment of the present invention, a hearing aid is provided comprising digital signal processing means to process input signals provided by a microphone to at least partially attenuate the unwanted spectral content heard by a person with cochlear hearing loss and boost low amplitude signals and attenuate high amplitude signals to reduce the forward masking in the time domain.

First Embodiment

Figure 4:
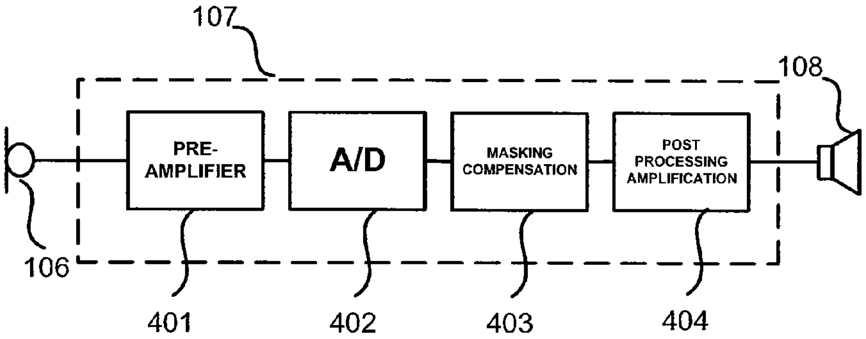
FIG. 4 is a block diagram illustrating the functional components that comprise the hearing aid of FIG. 1*b;*

FIG. 4 shows the functional components of a hearing aid 102 in a first embodiment of the present invention comprising a microphone 106, a signal processor 107 and a loudspeaker 108.

The microphone 106 is a transducer operable to produce an electrical signal proportional to received acoustic signals. The output of the microphone 106 is connected to the signal processor 107 and the output of the signal processor drives the loudspeaker 108.

The signal processing unit 107 comprises a preamplifier 401, an analog to digital converter 402, a masking compensation unit 403 and a post processing amplifier 404.

The preamplifier 401 is operable to amplify the signal provided by the microphone 106 to a level where it can be converted to a digital signal by the analog to digital converter 402 and subsequently be processed by the masking compensation unit 403.

The analog to digital converter 402 is operable to convert the analog electrical signal received from the preamplifier 401 into a discrete digital signal that can subsequently be processed by digital signal processing means.

The output of the analog to digital converter 402 is connected to the input of the masking compensation unit 403. The masking compensation unit is operable to process the signal received from the amplifier to compensate for the above described hearing defects found in a person suffering from cochlear hearing loss.

The output of the masking compensation unit 403 is connected to the input of the post processing amplifier 404. The post processing amplifier 404 is operable to amplify the signal received from the masking compensation unit 403 to a level where it can be reproduced as sound at the loudspeaker 109 after subsequent conversion to an analog signal.

The output of the masking compensation unit 403 is connected to the input of the post processing amplification unit 404, and the post-processing amplification unit 404 is connected to the loudspeaker 108. The post processing amplification unit 404 is a D-class amplifier that, as will be appreciated by those skilled in the art, is operable to provide an amplified analog output signal from the supplied digital input signal and drive the loudspeaker 108 directly. The loudspeaker 108 is operable to convert the electrical signal received from the post-processing amplifier 404 into an acoustic signal that is produced at the ear of the listener 101.

Masking Compensation Unit

The functional components of the 'masking compensation unit' of FIG. 4 will now be described with reference to FIG. 5.

The masking compensation unit 403 comprises a filter bank 501, an analytic signal divider (AMD) bank 502, an equaliser 503 and a signal adder 504.

The filter bank 501 comprises a bank of band pass filters operable to separate the input signal into eight frequency bands. The AMD bank is operable to receive corresponding frequency band signals from the filter bank and process each frequency band signal separately. Each AMD is operable to provide dynamic compression attenuating signals of amplitude greater than a threshold criterion and amplifying signals below said threshold. The threshold and compression ratio of each AMD is ideally predetermined according to the hearing loss profile of a particular individual 101 using the hearing aid 103. The dynamic compression acts to reduce the dynamic range of signals received at the ear and accordingly reduces the masking effect of loud sounds. In addition, as will be described in more detail below, the compression algorithm provides spectral contrast enhancement to compensate for simultaneous masking in the frequency domain and introduces inter-modulation distortion that mimics the distortion produced naturally by a healthy cochlea. Thus, the AMD is operable to at least partially compensate for all three of the above-mentioned effects associated with cochlear hearing loss.

The equaliser 503 is operable to receive the compressed signals from the compressor bank 502 and apply a predetermined amount of gain to each compressed frequency band signal. The amount of gain is pre-programmed into the equaliser 503 having been ideally pre-determined by profiling the hearing loss of an individual during an audiometric procedure. The signal adder 504 is operable to sum the signals output by the equaliser 503 to reconstruct the signal so that it can be output as sound by the loudspeaker 109.

Filter Bank

In particular, the filter bank comprises eight filters 501-01 to 501-08. The second to seventh filters 501-02 to 501-07 each comprise a cascade of a low pass filter and a high pass filter.

The parameters of the low pass filter are chosen so that the transition band is three times the pass band width and the response drops to −30 dB by the stop band edge. Similarly, the parameters of the high pass filter are chosen to give a transition band that is twice the pass band width and the response drops to −60 dB in the transition band. The first and eighth filters 501-01 and 501-08 are a special case, and merely comprise a low pass and a high pass filter respectively.

Figure 6:
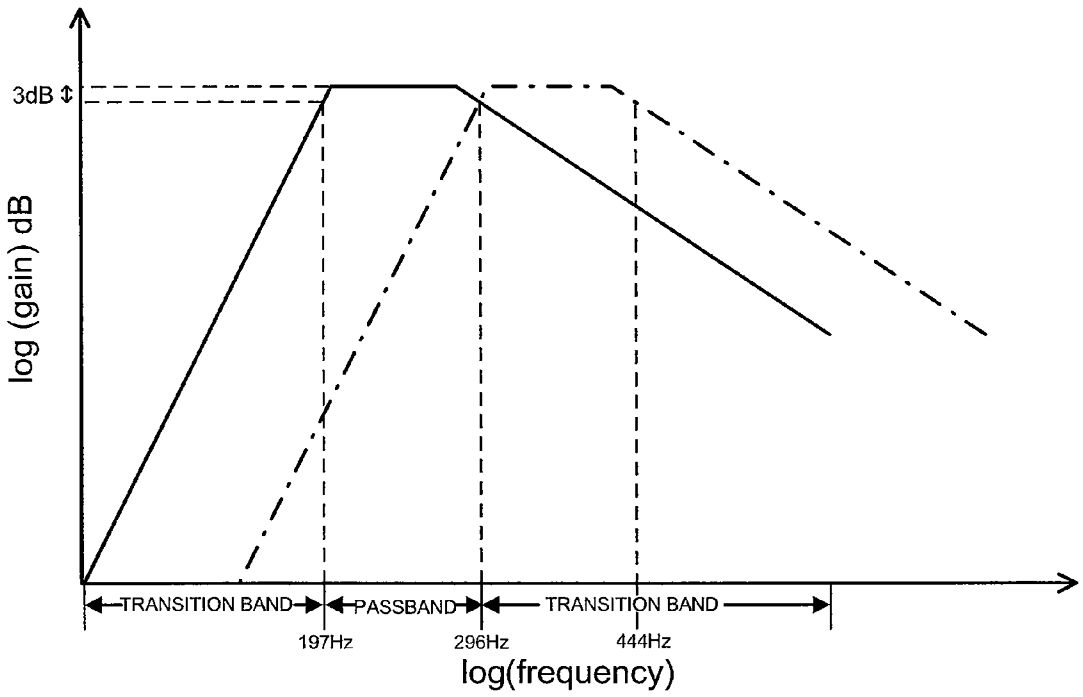
FIG. 6 is a plot showing transfer functions representative of two of the digital filters of FIG. 5.

An example of the shape of the resulting transfer function and the relative positions of the pass band, transition band and stop bands of the second and third filters 501-02 and 501-03 is given in FIG. 6. Each filter acts as band pass filter allowing the frequencies in the pass band to pass through the filter substantially unaffected and attenuating the frequencies in the two transition bands above and below the passband. The passband edges of the second filter 501-02 are denoted by the 3 dB points at 197 Hz and 296 Hz respectively. Similarly, the beginning and end of the passband of the third filter is denoted by the 3 dB points at 296 Hz and 444 Hz respectively. The frequency of the beginning passband 3 dB point is always 2/3 of the frequency of the end passband 3 dB point in each of the filters 502-01 to 502-07. In particular, the passband of the fourth filter 501-04 is 444-666 Hz, the fifth 501-05 is 666-1 kHz, the sixth 501-06 is 1 kHz to 1.5 kHz, and the seventh 501-07 is 1.5 to 2.25 kHz, where the frequencies denote the 3 dB points at the beginning and end of the passband of each filter respectively.

The overlapping sloped transition bands of the filters 501-01 to 501-08 allow the filters to act both as a band pass filter and to simulate the auditory filtering that is performed in the ear before the natural compression provided by a healthy cochlea. The first and eighth filters 501-01 and 501-08 are low pass and high pass filters respectively, with respective 3 dB points of 196 Hz and 2.25 kHz. As most of the characteristic frequency content (and in particular speech) will be present in the range of 0-2.25 kHz, it is not necessary to simulate the auditory filter action of the ear outside this frequency range. Although eight filters are used in this embodiment, as will be appreciated by those skilled in the art, other numbers of filters could be used depending on the auditory filtering model assumed by the designer.

Analytic Magnitude Divider (AMD) Bank

The AMD bank comprises eight AMDs 502-01 to 502-08. The outputs of the eight filters 501-01 to 501-08 are connected to the corresponding inputs of the eight AMDs 502-01 to 502-08 respectively. Each AMD is operable to provide dynamic compression of an input signal attenuating signals above said threshold. The ratio by which the above threshold signal is attenuated is determined by a predetermined compression ratio. The compression ratio is defined as the ratio between the change of input signal and the change of output signal above the threshold. For example, a compression ratio of 3:1 would mean that, for an input signal that is 3 dB above the threshold, the output level will be 1 dB above the threshold.

It is known that hearing loss is typically greater for higher frequency sounds and, therefore, it is desirable to compensate for this by using higher compression ratios for higher frequency acoustic signals. In this embodiment, the compression ratio of each AMD 502-01 to 502-08 is stored in each AMD 502-01 to 502-08 according to the hearing loss profile of a particular user. The frequency dependence can be effectively approximated by having the compression ratio increase linearly from a minimum value for the first compressor 502-01, which compresses the lowest frequency band signal, to a maximum for the eighth compressor 502-08, which compresses the highest frequency band signal. The maximum and minimum values will ideally be chosen based on the hearing loss profile of the user.

Equaliser

The equaliser comprises eight amplifier units 503-01 to 503-08. The outputs of the eight AMDs 502-01 to 502-08 are connected to the inputs of corresponding amplifiers 503-01 to 503-08.

Each amplifier 503-01 to 503-08 is operable to digitally amplify the output signal provided by the corresponding compressor 502-01 to 502-08. The amount of gain provided by each amplifier is predetermined ideally based on the hearing loss profile of the user. In this way, if a user suffers particularly acute hearing loss over a certain range of frequencies then the gain of the amplifier for the corresponding frequency band can be set to a high level to compensate.

The outputs of the amplifiers 503-01 to 503-08 are connected to the input of the signal adder 504. The signal adder 504 is operable to add the signals received from the eight amplifiers to provide a single composite output signal for reproduction at the ear.

Analytic Magnitude Divider (AMD)

A healthy cochlea in the human ear effectively acts as an infinitely fast compressor so that quieter sounds incident at the ear subsequent to louder sounds can be heard. Conventional electronic signal compressors have an associated attack time and decay time. The attack time is the length of time taken for the compressor to react to an increase in signal amplitude and provide the necessary attenuation, while the decay time is the length of time for the compressor to react to a decrease in input signal amplitude and provide the necessary gain. To emulate the natural instant compression of the cochlea, the attack and decay time should ideally be zero. This, however, is not possible using a conventional compressor because the amplitude of the input signal cannot be measured instantaneously. Instead, the amplitude can only be measured over at least a single period of the waveform. As the amount the signal is to be attenuated or amplified is determined based on the amplitude of the input waveform, there will always be a delay associated with the compressor reacting to changes in amplitude.

One way to calculate the amplitude of the signal substantially instantaneously is to use an analytic signal representation of the input signal. An analytic signal is a complex representation of the input signal where the imaginary component is generated by performing a Hilbert transform on the input signal. The Hilbert transform merely generates an imaginary component that is comprised of frequency components identical in amplitude to those of the real input signal but phase shifted by 90 degrees.

The resulting signal is effectively a vector rotating in the complex plane with respect to time. The length of the vector describing the complex signal gives the amplitude of the real input signal. Further, the frequency of the signal can also be evaluated substantially instantaneously by calculating the rate of change of the phase of the vector with respect to time.

There is a problem with using such a technique, in that the imaginary component cannot be generated instantaneously as its calculation requires fore-knowledge of the corresponding real signal. Therefore, there is always some time delay associated with calculating the Hilbert transform and only an approximation may be realized.

In this embodiment, the Hilbert transform is calculated using two all-pass filters. An all-pass filter lets all frequencies through, but has an associated phase shift for every frequency. The phase response of the all-pass filters can be designed such that the phase difference between the output signal of a first all-pass filter and a second all pass filter is 90 degrees for all frequencies in the frequency range of interest. For audio applications, the frequency range of interest is the range of human hearing from approximately 20 Hz to 20 kHz.

The functional components of the AMD 502-01 will now be described with reference to FIG. 7. Fast compressors 502-02 to 502-08 operate in a substantially identical manner, and therefore (in the interest of brevity) their only description of the first AMD 502-01 will be given here.

The fast compressor 502-01 comprises an analytic signal calculator 701, an instantaneous amplitude calculator 702, a threshold signal adder 703, a signal divisor calculator 705, and a divider 707.

The analytic signal calculator is operable to calculate the Hilbert transform of the input signal. A first output 701*a* of the analytic signal calculator provides the real part of the generated analytical signal $h_1(t)$, and a second output 701*b* provides the imaginary part of the analytical signal $h_2(t)$, as calculated by performing a Hilbert transform. The first and second outputs 701*a* and 701*b* are connected to the inputs of the instantaneous amplitude calculator 702.

The instantaneous amplitude calculator 702 is operable to calculate the instantaneous amplitude of the received analytical signal. The momentary amplitude is calculated by calculating the magnitude of the analytical signal in the complex plane. This is evaluated by adding the squares of the magnitude of the real component $h_1(t)$ and the magnitude of the imaginary component $h_2(t)$ and calculating the square root of the result. This calculation is done in accordance with the following equation:

$$A(t)=\sqrt{h_1^2(t)+h_2^2(t)} \quad (1)$$

The instantaneous amplitude calculator 702 has a single output, providing the instantaneous amplitude of the input signal, which is connected to the input of the threshold signal adder 703.

The threshold signal adder 703 is operable to add a threshold signal value K to the calculated instantaneous amplitude A(t). The threshold signal value K is predetermined and provided by a threshold signal source 704. Adding a threshold signal value ensures first that it is not possible for the value provided to the divider to be zero, therefore, avoiding any possible divide by zero errors. Second, it provides the threshold at which point the AMD begins to attenuate the input signal. The output of the minimum signal adder 703 is connected to the input of the signal divisor calculator 705.

The signal divisor calculator is operable to calculate the value of the divisor to be used by the divider 707. The divisor value is calculated from the following equation:

$$D(t) = (A(t)+K)^{\left(\frac{CR-1}{CR}\right)} \quad (2)$$

where D(t) is the calculated divisor, CR is equal to the compression ratio, A(t) is the momentary amplitude, and K is the threshold signal value. As can be seen from equation (2), the value of $$\frac{CR-1}{CR} \to 1 \text{ as } CR \to \infty$$

and, therefore, the divisor $D(t) \to A(t)+K$ as $CR \to \infty$. In this embodiment the compression ratio CR is pre-stored and read from a compression ratio store 706. As will be described below, however, in further embodiments of the present invention, the stored compression ratio value can be adjusted, for example, manually by a user, or automatically as part of an audiometric test on the user. As each AMD 502-01 to 502-08 has an individual compression ratio store 706, the compression ratio can have different values for each AMD 502-01 to 502-08. Typically, as explained above, it is preferable to have a higher compression ratio for the higher frequency bands than the lower frequency bands and this will, therefore, be reflected in the pre-programmed values of compression ratio.

The output of the signal divisor calculator is connected to a first input 707*a* of the divider 707. The real signal output 701*a* of the analytic signal calculator 701 is further connected to the second input 707*b* of the divider 707. The divider is operable to calculate the result of dividing the real component of the generated analytic signal $h_1(t)$ provided at the second input 707*b* by the calculated signal divisor D(t) provided at the first signal input 707*a*. It is preferable to use the real component of the generated Hilbert transform rather than the input signal as the dividend because of the delay resulting from the generation of the analytic signal. The output of the divider, therefore, is the value of the real component of the analytic signal $h_1(t)$ attenuated or amplified depending on whether the calculated divisor D(t) is greater or less than one respectively.

Turning now to FIG. 7*b*, illustrated are the functional components of the analytic signal generator 701. As shown, the analytic signal generator 701 comprises a first all-pass filter 708 and a second all-pass filter 709. The output of the filter 501-01 is connected to both the input of the first all-pass filter 708 and the input of the second all-pass filter 709.

A plot showing the phase response of the first and second all-pass filters 708 and 709 is given in FIG. 7*c*.

As shown in FIG. 7*c*, the phase difference between the phase response of the first all-pass filter 710 and the phase response of the second all-pass filter 711 is 90 degrees in the region of 20 Hz to 20 kHz that approximately corresponds to the range of frequencies audible to the human ear. Frequencies outside this range are outside the range of frequencies that can be perceived by human hearing, and therefore any phase distortions outside this range should not affect the quality of the output signal heard by a user. The corresponding transfer functions (not shown) of the first and second all-pass filters are identical, and ideally have unity gain for all frequencies, therefore, letting all frequencies pass through with their magnitude unaffected.

The output of the first all-pass filter 708 provides the real component of the analytic signal, while the output of the second all-pass filter 709 provides the value of the imaginary component of the analytic signal.

As discussed above, the AMD 502-01 also provides spectral contrast enhancement and inter-modulation distortion generation to compensate for the lack of simultaneous masking and inter-modulation distortion found in individuals suffering from cochlear hearing loss. These additional effects are a by-product of the compression algorithm described above, and the generation of these effects will now be explained with reference to FIGS. 8*a* to 8*c* and 9.

FIG. 8*a* shows a plot of the frequency spectrum of an arbitrary acoustic signal received by the hearing aid 103. The y-axis 801 denotes amplitude, while the x-axis 802 denotes frequency. The frequency spectrum of the arbitrary signal consists of a low frequency component 803 and a high frequency component 804, both having equal amplitude and frequencies $\omega_1$ and $\omega_2$ respectively. Also shown on the plot is the outline 805 of the transfer function of one of the overlapping filters 501-01 to 501-08. As shown, the pass band of the filter 805 is approximately centred on the low frequency component 803, while the high frequency component is situated toward the end of the transition band of the cascaded low pass filter component of the transfer function 805.

As described above, an acoustic signal is received by the microphone 106, it is converted to an electric signal and is amplified and digitized by the preamplifier 401 and the A/D 402 respectively. The signal from the preamplifier is then provided to the masking compensation unit 403. The digitized microphone signal is split and sent to each of the filters 501-01 to 501-08, where the signal is modified in accordance with the transfer function of the corresponding filter. In the example of FIG. 8*a*, a single filter is shown which could be any of the filters 501-01 to 501-08 of FIG. 5. In this example, the microphone signal comprises the frequency components 803 and 804 of FIG. 8*a*.

Turning now to FIG. 8*b*, illustrated is the frequency spectrum of FIG. 8*a* after it has undergone filtering by the filter 805. As shown, the low frequency component 803 is substantially unchanged while the high frequency component 804 is attenuated in accordance with the filter shape 805. Once the signal has been processed by the filter, it is sent to a corresponding analytic magnitude divider 502-01 to 502-08.

As described above each AMD includes an analytic signal calculator 701 that generates a corresponding imaginary counterpart to the real input signal. As already described above the resulting analytic signal is equivalent to a rotating vector in the complex plane. Turning now to FIG. 9, vector $\vec{B}$ 903 represents the analytic signal of the real input signal of FIG. 8*b* as generated by the analytic signal calculator 701. The rotating vector $\vec{B}$ 903 can be thought of as comprising the sum of two component vectors $\vec{A}_1$ 901 and $\vec{A}_2$ 902 that represent the low and high frequency components 803 and 804 respectively. The vectors $\vec{A}_1$ 901 and $\vec{A}_2$ 902 have a length equal to the amplitude of the respective frequency components 803 and 804 and rotate at frequencies equal to $\omega_1$ and $\omega_2$ respectively. As the vector $\vec{B}$ 901 is the sum of the two component vectors $\vec{A}_1$ 901 and $\vec{A}_2$ 902 its length (i.e. the signal amplitude) will vary from $|\vec{A}_1|-|\vec{A}_2|$ to $|\vec{A}_1|+|\vec{A}_2|$ while its frequency $\omega_B$ will vary from $\omega_1-\omega_2$ to $\omega_1+\omega_2$. The high frequency component $\vec{A}_2$ 902 is, therefore, effectively frequency modulating the vector $\vec{A}_1$ 901.

In this example we assume an ideal case where the compression ratio is infinite and, therefore, the amplitude of the output signal is always equal to one. The output signal in this case is represented by the vector $\vec{C}$ 904. The vector $\vec{C}$ 904 has unity length but its frequency $\omega_C$ is still equal to $\omega_B$ and will, therefore, still vary from $\omega_1-\omega_2$ to $\omega_1+\omega_2$. The spectrum of the compressed output signal is shown in FIG. 8*c*. The resulting output spectrum has additional frequency components corresponding to the frequency modulation provided by the high frequency component $\vec{A}_2$ 902. The additional frequency components correspond to inter-modulation distortion frequencies in the range $\omega_1-\omega_2$ to $\omega_1+\omega_2$. These additional frequency components provide the inter-modulation distortion that would be generated by a healthy cochlea. As frequency $\omega_2$ is greater than $\omega_1$ it is possible for the vector $\vec{C}$ 904 to have either a negative or positive frequency. In addition, as a further consequence of the frequency modulation, the amplitude of the high frequency component 804 will be attenuated as shown in FIG. 8*c*. This attenuation provides spectral contrast enhancement that provides some compensation for the missing simultaneous masking found in listeners suffering from cochlear hearing loss.

Example of Filtered and Processed Signals

Turning now to FIG. 10*a*, an example is shown of the processing of an arbitrary signal by the fifth channel (666-1 kHz) of the masking compensation unit 403 of FIG. 5. First, two plots are shown of an arbitrary input signal, one in the time domain 1001*a* where magnitude is denoted by the y-axis and time denoted by the x-axis and the other in the frequency domain where amplitude is denoted by the y-axis and frequency by the x-axis. The signal is shown after filtering by the filter 501-05 (666-1 kHz) of FIG. 5 in respective time and frequency domain plots 1002*a* and 1002*b*. As shown by plot 1002*b*, the frequencies in the range 666 Hz to 1 kHz are substantially unaffected by filter 501-05, while frequencies outside of this range are gradually attenuated by the asymmetric transition bands of the filter 501-05. Plots 1003*a* and 1003*b* show the signal after processing by the analytic magnitude divider 502-05 in the time and frequency domain respectively. In this example, the compression ratio CR stored in the compression ratio store 706 of the AMD 502-05 is equal to 3. The resulting heavy dynamic compression can be clearly seen in the time domain plot 1003*a*. Further, it can also be seen by comparison with plot 1002*a* that the compression is substantially instantaneous. Turning to plot 1003*b*, it can be seen that the processing has introduced some further additional spectral content in the upper frequencies. Further, it can be seen that the spectral components toward the upper band pass edge (1 kHz) have been attenuated relative to those of the lower band pass edge (666 Hz), thereby providing spectral contrast enhancement to compensate for the missing simultaneous masking action found in a healthy cochlea.

Turning now to FIG. 10*b*, illustrated is a comparison between an arbitrary input signal and the total output signal of the signal adder 504 of the masking compensation unit 403 of FIG. 5. Plots 1004*a* and 1004*b* show the input signal which is identical to the input signal of 1001*a* and 1001*b*, but plotted on a different magnitude scale for ease of comparison with the plots of the corresponding output signals. The total output signal for compression ratio equal to 1 is shown in the plots 1005*a* and 1005*b* corresponding to the time and frequency domain respectively. As shown, the dynamics of the signal in the time domain remain substantially unaffected, as would be expected for a compression ratio of 1. The overall signal level has increased as a consequence of the overlapping nature of the filters. Inspection of the frequency domain plot shows greatly increased spectral contrast, that is to say the difference between the peaks and valleys of the frequency spectrum are increased. Therefore, even when the signal is uncompressed, the AMD provides the desired spectral contrast enhancement and additional inter-modulation distortion.

Turning now to plots 1006*a* and 1006*b*, illustrated is the resulting total output signal for a compression ratio of 3 in the time and frequency domain respectively. As can be seen from plot 1006*a*, the dynamics of the input signal are greatly reduced and the compression is substantially instantaneous. Inspection of the signal in the frequency domain 1006*b* shows that the increase in spectral contrast and inter-modulation is also present. Thus, the masking compensation unit 403 successfully compensates for the three effects associated with cochlear hearing loss by compressing, enhancing spectral contrast and adding inter-modulation distortion to the input signal.

SUMMARY AND ADVANTAGES

A hearing aid system has been described above that uses a combination of band pass filters and analytic magnitude dividers to compensate for at least some of the symptoms of cochlear hearing loss.

Each frequency band is processed individually by a separate analytic magnitude divider. Each analytic magnitude divider is operable to perform an instant compression algorithm, taking advantage of the ability to calculate the instantaneous amplitude of a signal using the Hilbert transform to reduce the dynamics of the input signal. As described above, the compression algorithm in this embodiment is particularly advantageous because it has the additional effect of increasing the spectral contrast of the input signal and adding additional inter-modulation distortion to the output signal. Thus, the symptoms of increased forward masking, decreased simultaneous masking, and inter-modulation distortion loss can be compensated for by using a single simple algorithm.

In addition, the use of band pass filtering to separate the input signal into frequency bands allows different compression ratios to be applied to different frequency bands. This may be advantageous because cochlear hearing loss has been shown to be frequency dependent. This may be desirable to apply higher compression ratios to higher frequency bands. Further, the use of the uniquely shaped band pass filters with sloping transition bands allows the signal to be pre-processed in a manner similar to which it would be filtered by the auditory filters present in the ear before the natural compression provided by a healthy cochlea.

A further advantage is that conventional digital signal processing techniques can be easily integrated into the above-described system. For example, further conventional hearing aid signal processing could take place following the above-described masking compensation circuitry to compensate for a hearing impediment while still taking advantage of the cochlea hearing loss compensation provided by the above embodiment.

In addition, the hearing aid apparatus is relatively inexpensive and quick to manufacture, due to the fact that the signal processing is performed using a combination of conventional digital signal processing techniques that, as will be appreciated by the person skilled in the art, are easily implemented by dedicated integrated circuitry or by a suitably programmed processor.

Second Embodiment

In the above-described embodiment, the compression ratio values stored in the compression ratio store 706 of each AMD 502-01 to 502-08 and the gain values for each channel 503-01 to 503-08 of the equalizer 503 are predetermined, preferably by audiometric testing, and pre-stored in the hearing aid before issue to a user. In a further embodiment of the present invention, the parameters of the hearing aid are configurable by user via a control unit connected to the hearing aid.

FIG. 11 shows a hearing aid system that comprises a hearing aid 103 and a control unit 1101. The hearing aid 103, similar to the hearing aid of FIG. 4, but additionally comprises an I/O interface 1101 and has a configurable masking compensation unit 1103. The control unit 1101 is connected to the hearing aid via the I/O interface 1102. In this embodiment, a listener can configure the parameters of the hearing aid as and when they desire to do so using the control unit 1101 which communicates with the masking compensation unit 403 of the hearing aid via I/O interface 1102.

The control unit comprises a user interface 1103, a compression ratio parameter store 1104, a compression ratio calculator 1105, and a gain value store 1106. The compression ratio parameter store 1104 and the gain value store 1106 are connected to the J/O interface 1102.

The user interface 1103 allows a user to view the compression ratio parameters and gain values presently being used by the hearing aid. The values are read from the compression ratio parameter and gain value stores 1104 and 1106 respectively, and provided to the user interface 1103. Further, the user interface provides a means for a listener to enter new values for the compression ratio and gain of each amplifier in the equalizer 503. In particular, the user interface comprises a display and a keypad for data entry. Of course, as will be appreciated by those skilled in the art, many other types of user interface are possible that provide means for inputting and displaying data. A listener enters the values via the keypad, forming part of the user interface 1103. The entered values are stored in the compression ratio parameter store 1104 or the gain value store 1106. The compression ratio values are then transmitted to the hearing aid 103 from the compression ratio calculator 1105 and the gain value store 1106 via the I/O interface 1101. The user interface 1103 is further operable to display user instructions and information relating to the present compression ratio and gain values stored in the masking compensation unit 403 of the hearing aid 103.

The compression ratio parameter store 1104 is operable to store a maximum compression ratio value, a compression ratio slope value, and a threshold value. As described above, undesirable forward masking is more prevalent for higher frequencies. Therefore, to introduce some frequency dependence for the compression ratio, it is desirable to have linearly increasing compression ratio values provided to the analytic magnitude dividers 502-01 to 502-08. The output of the compression ratio store 1104 is connected to the input of the compression ratio calculator 1105. The compression ratio calculator 1105 is operable to calculate the compression ratio values for each of the AMDs 502-01 to 502-08 based on the maximum compression ratio and compression ratio slope stored in the compression ratio parameter store 1104.

The rate at which the compression ratio increases toward the maximum compression ratio value with frequency is related to the compression ratio slope value. The user may select, via the user interface 1103 of the control unit 1101, a compression ratio slope value between zero and one which is subsequently stored in the compression ratio parameter store 1104. A compression ratio slope value of one gives the maximum gradient and the compression ratio varies from one for the lowest frequency band to the maximum compression ratio for the highest frequency band. A compression ratio slope value of zero corresponds to the compression ratio being equal to the maximum compression ratio value across all frequency bands. The compression ratio value for a particular frequency band is given by the expression:

$$CRout(bandnumber) = CRin - \frac{(CRin - 1)\cdot \text{slope}}{noofbands - 1}\cdot(noofbands - bandnumber) \quad (3)$$

where:

- ‘CRout’ is the calculated compression ratio which is a function of ‘bandnumber’ where 1≦bandnumber≦noofbands;
- ‘CRin’ is equal to the maximum compression ratio value stored in the compression ratio parameter store 1104;
- ‘slope’ is the compression ratio slope value stored in the compression ratio parameter store 1104;
- ‘noofbands’ is the total number of frequency bands processed in the masking compensation unit 403 (in this embodiment there are 8); and,
- ‘bandnumber’ is an integer denoting the frequency band.

The compression ratio calculator 1105 is operable to evaluate equation (3) above to determine the compression ratio to be used for each of the AMDs 502-01 to 502-08. Upon calculating each compression ratio value, the calculated value along with the stored threshold value is sent by the CR calculator to the corresponding AMD 502-01 to 502-08. The compression ratio value is stored in the compression ratio store 706, and the threshold value is stored in the threshold signal source 705 of the corresponding AMD 502-01 to 502-08. Similarly, the gain value store 1106 is operable to store a gain value corresponding to each of the amplifiers 503-01 to 503-08. Upon the user entering new values, the values are stored in the gain value store 1106 and the values sent to the corresponding amplifier 503-01 to 503-08.

FIG. 12 shows the configurable masking compensation unit 1103 of FIG. 11. As shown the configurable masking compensation unit comprises a filter bank 501, an AMD bank 502, an equalizer 503 and a signal adder 504 all of which operate in an identical manner to the corresponding components of the first embodiment. The configurable masking compensation unit further comprises a connection from the CR calculator 1105 of the control unit 1101 to each of the AMDs 502-01 to 502-08 and a connection from the gain value store to each of the amplifiers 503-01 to 503-08 respectively. Thus, the gain and compression ratio values can be transmitted from the control unit 1101 to the appropriate AMD 502-01 to 502-8 or amplifier 503-01 to 503-08 as necessary.

Third Embodiment

In the above of embodiments, the compression ratio values and the gain values are either predetermined or manually entered by a user via control unit. In a further embodiment, the hearing aid apparatus is operable to perform a hearing test in cooperation with a suitably programmed computer to determine the dynamic range of a user's hearing.

FIG. 13 shows a hearing aid calibration system comprising a computer 1301, a loudspeaker 1302, a transmitter 1303, and a user 101, wearing left and right hearing aids 102 and 103. Both the transmitter 1303 and the loudspeaker 1302 are connected to outputs of the computer 1301. The computer is operable to facilitate an audiometric test by generating test signals which are subsequently reproduced as acoustic signals via the loudspeaker 1302. Hearing aid parameters are adjustable using the computer 1301. A hearing test that evaluates the dynamic range of a user's hearing can be performed by evaluating the relative loudness of signals played back to the user while varying the compression ratio parameters of the hearing aid.

The computer 1301 is a conventional desktop computer that comprises a memory, a processor, a display and an input device such as a keyboard or mouse. Data files are stored in the computer 1301 memory containing data relating to audio test signals. The audio test signals represent real life audio situations that have been recorded or synthesized and subsequently stored on the computer. The computer 1301 is suitably programmed so as to display a graphical user interface that allows the user to select the maximum compression ratio, compression ratio slope, threshold value and the gain values for the amplifiers 503-01 to 503-08. When the hearing aid parameters are selected on screen, they are subsequently transmitted to the hearing aid 103 by the transmitter 1303.

FIG. 14 shows the functional components of a hearing aid 103 in this embodiment. As in the above embodiments, the right hearing aid 103 comprises a microphone 106, a signal processing unit 107, and a loudspeaker 108. The signal processing unit 107 comprises a preamplifier 401, an analog to digital converter 402, and a post processing amplifier 404, which operate in a like manner to the corresponding components of the first embodiment. In this embodiment, the signal processing unit 107 further comprises a receiver 1402 which is connected to the input of a configurable masking compensation unit 1401, which takes the place of the masking compensation unit 403 of FIG. 4.

The functional components of the configurable masking compensation unit 1401 are shown in FIG. 15. As shown, the masking compensation unit 1401 comprises a filter bank 501, an AMD bank 502, an equalizer 503, and a signal adder 504, which all operate in a like manner to the corresponding components of the first embodiment. The masking compensation unit further comprises a controller 1501. The output of the receiver 1402 is connected to the input of the controller 1501. The output of the controller 1501 is connected to the AMDs 502-01 to 502-08 and the amplifiers 503-01 to 503-08. The controller 1501 is operable to route the data values received from the transmitter 1303 to the intended AMD 502-01 to 502-08 or amplifier 503-01 to 503-08, as appropriate.

To perform a hearing test, the user or an acoustician chooses a test signal from a list provided on the graphical user interface. The displayed test signals correspond to test signals stored on the memory of the computer 1301. The user may then adjust the hearing aid parameters (maximum compression ratio, compression ratio slope, threshold and gain values) as desired on the computer 1301. The compression ratio values to be applied to each of the AMDs 502-01 to 502-08 will be calculated in accordance with equation (3) above in a like manner to the second embodiment. As part of the graphical user interface, there is displayed an option to start the test. Upon selecting this option, the selected hearing aid parameters are transmitted to the hearing aid. The hearing aid receiver 1402 receives the transmitted data and passes it to the controller 1501. The controller then routes each data value to the appropriate AMD 502-01 to 502-08 or amplifier 503-01 to 503-08 of the masking compensation unit 1401 where they are subsequently stored. Once the computer has transmitted the parameters to the hearing aid 103, the chosen test signal is reproduced by the computer as sound through the loudspeaker 1302. The possible test signals are speech signals recorded in a variety of noisy environments. For example, such environments could include a shopping centre, a restaurant, a highway or a highly reverberant room or hall. Speech recorded with full dynamics in anechoic conditions is unrealistic because it does not represent the conditions that speech will normally be heard in. Therefore, it is preferable to use speech signals recorded in typical acoustic situations.

The acoustic signal reproduced by the loudspeaker 1302 is then received by the microphone 106 of the hearing aid 103. The received signal is processed by the signal processor 107 and the processed signal output via loudspeaker 108 at the ear of the listener 101. The listener, upon hearing the sound, can note the loudness level of the signal. The result can be entered on the computer and stored to produce a record of the test.

A variety of different loudness tests can be performed by varying the compression ratio, compression ratio slope and threshold. First, the max compression ratio can be increased in a step-by-step manner with the test signal being reproduced as sound at each step. As the compression ratio is increased, the listener will experience increased loudness in the signal they are hearing. Eventually increasing the CR will no longer affect the subjective loudness of the signal heard by the listener. The value at which changing the compression ratio no longer increases the subjective loudness gives a measure of the dynamic range of the user's hearing. A similar test can be performed by changing the compression threshold in step wise manner. Increasing the threshold will reduce the subjective loudness of the signal with the point at which increasing the threshold no longer affects the loudness, again giving a measure of the dynamic range of the user's hearing. Finally, the compression ratio slope can be swept while keeping the max compression ratio and threshold constant. The subjective loudness should become quieter as the gradient of the slope is increased. Again, the value at which changing the slope no longer has an effect on loudness will give a measure of the dynamic range of the listener's hearing.

Although the above embodiment has been described in terms of a hearing test performed with the right hearing aid 103, the description is also valid for a hearing test involving the left hearing aid, or in fact both left and right hearing aids.

Further Embodiments

In the embodiments described above, the masking compensation unit comprises eight channels, each channel comprising a filter 501-01 to 501-08, an AMD 502-01 to 502-08 and an amplifier 503-01 to 503-08. It should be noted, however, that the present invention is not limited to having 8 channels. In further embodiments, the masking compensation unit can have any number of channels greater than or equal to 2. As will be appreciated by those skilled in the art, the chosen number of channels will depend on the particular auditory filter model chosen by the designer to emulate the auditory filtering found in a healthy ear.

In the embodiments described above, the analytic magnitude divider of FIG. 7*a* is described as having an output that is the result of dividing the real component of the generated analytic signal $h_1(t)$ by a calculated divisor D(t). In a further embodiment, the input signal provided by the filter 501-01 is connected to the second input 707*b* of the divider 707, instead of the real output 701*a* of the analytic signal calculator 701. The output in this case, therefore, will be the result of dividing the input signal i(t) by the divisor D(t).

In the second embodiment described above, the control unit is connected to the signal processor 107 of the hearing aid via electrical wires. In a further embodiment, the control unit is connected to the I/O interface 1101 via a wireless connection such as, for example, a Bluetooth connection.

In the second embodiment above, only a single set of hearing aid parameters is stored in the hearing aid at a time. In a further embodiment, a plurality of sets of parameters may be stored in the hearing aid. The user interface of the control unit gives the user the option to switch between the different sets of parameters. This may be desirable if the user is moving between different noisy environments and wishes to use a set of parameters optimized for the environment the user is currently in.

In the third embodiment above, the hearing test is performed using a hearing aid in cooperation with a general purpose computer. The computer provides test signals which are reproduced as sound via a loudspeaker and subsequently received by a hearing aid worn by a user. In a further embodiment, the hearing aid processing is carried out on the computer itself and no physical hearing aid is required. The stored test signals are processed directly on the computer by the hearing aid software that performs the function of the blocks described above, and the processed signal is output to a user via a pair of earphones. Processing of the test signals may include pre-processing to simulate the acoustics of a test environment or directionality. In this way, the hearing test can be carried out cheaply and efficiently, without the need for further hardware.

In a further embodiment, the sweeping of parameters in the hearing aid test of the third embodiment is not performed manually by editing the values on a computer, but instead is performed automatically. The computer will step through compression ratio, compression ratio slope or threshold values according to a predetermined sequence with the test signal being reproduced as sound and evaluated by a listener at each step. Instructions to a user taking part in the hearing test will ideally be displayed on the computer to instruct the user as to what to do at each step of the test. Use of such an automatic test allows for faster testing and removes the need for an expert acoustician to perform the testing.

In the third embodiment described above, the computer communicates with the hearing aid wirelessly. In a further embodiment, the hearing aid is instead connected to the computer via electrical wires and data is sent to the hearing aid via said electrical wires.

In the above embodiments, the operation of the hearing aid apparatus was described in terms of hardware circuits. As those skilled in the art will appreciate, the circuit's functionality can be provided by dedicated circuits or by programmable circuits that are programmed by suitable software. This software can be loaded into the programmable circuits via a CD ROM or the like, or alternatively it may be downloaded as a signal over a computer network.

The invention claimed is:

1. A hearing aid comprising:

(a) input transducer means for converting input acoustic signals into electrical input signals;

(b) signal processor means operable:

(i) to divide said electrical input signals into a plurality of frequency bands signals;

(ii) to perform an intermodulation distortion generation operation on each of said frequency band signals, said intermodulation distortion generation operation comprising 1. providing an all pass filter means for generating two signals from each frequency band signal, a first all pass signal $h_1(t)$ and a second all pass signal $h_2(t)$, the second all pass signal having a phase offset of 90 degrees from the first all pass signal;
2. forming an instantaneous amplitude A(t) from said first all pass signal $h_1(t)$ and a second all pass signal $h_2(t)$, wherein A(t) comprises the absolute value of $h_1(t)$ and $h_2(t)$; and
3. modulating either said each frequency band signal or the first all pass signal $h_1(t)$ according to said instantaneous amplitude signal A(t) to produce a modulated band signal for each of said frequency band signals; and (c) output transducer means operable to produce and output acoustic signal corresponding to a combination of said modulated band signals.

2. A hearing aid according to claim 1 wherein said signal processing means further comprises means for dividing each frequency band signal by a divisor value D(t) given by $$D(t)=(a(t)+K)^{(CR-1/CR)}$$

where A(t) is the instantaneous amplitude of the frequency band signal, K is a threshold criterion and CR is a predetermined ratio.

3. A hearing aid according to claim 2 comprising signal processor means operable to (a) perform a Hilbert transform on each of a plurality of different said frequency band signals to generate an analytic signal, said analytic signal comprising real and imaginary signals $h_1(t)$ and $h_2(t)$ ; and (b) calculate an instantaneous amplitude of each of the frequency band signals by evaluating the expression $$A(t)=\sqrt{h_1^2(t)+h_2^2(t)}.$$

4. A hearing aid according to claim 3 wherein the signal processor means performs said Hilbert transform by (a) splitting the frequency band signals into substantially identical first and second electrical signals;

(b) filtering the first electrical signal with a first all-pass filter, said first all-pass filter having a linear phase response in a range of frequencies; and (c) filtering the second electrical signal with a second all-pass filter, said second all-pass filter having a linear phase response in said range of frequencies, and wherein the phase response second all-pass filter differs from the phase response of the first electrical signal in said range of frequencies by $\pi/2$ radians.

5. A hearing aid according to claim 3 wherein said signal processor means further comprises, compression and intermodulation distortion generation means for dividing the real component of the analytic signal $h_1(t)$ by the divisor D(t) where $$D(t) = (A(t) + K)^{\left(\frac{CR-1}{CR}\right)}$$

where A(t) is the instantaneous amplitude of the frequency band signal, K is a threshold criterion and CR is a predetermined ratio.

6. A hearing aid according to claim 5 wherein the compression ratio CR varies with the frequency of a frequency band signal according to the expression $$CR = CRin - \frac{(CRin - 1)\cdot \text{slope}}{noofbands - 1}\cdot (noofbands - bandnumber)$$

where 'CRin' is a maximum compression ratio value', slope' is a value between zero and one denoting the rate of change of compression ratio with a frequency band number', noofbands' is the total number of frequency bands and 'bandnumber' is the frequency band number.

7. A hearing aid according to claim 6 wherein the value of 'slope' can take a value greater than one and wherein the compression ratio 'CR' is forced to always having a value greater than or equal to one.

* * * * *